United States Patent [19]
Looi et al.

[11] Patent Number: 6,134,632
[45] Date of Patent: Oct. 17, 2000

[54] CONTROLLER THAT SUPPORTS DATA MERGING UTILIZING A SLICE ADDRESSABLE MEMORY ARRAY

[75] Inventors: Lily Pao Looi, Portland; Sin Tan, Hillsboro; John Urbanski, Hillsboro; Christopher Van Beek, Hillsboro, all of Oreg.

[73] Assignee: Intel Corporation, Santa Clara, Calif.

[21] Appl. No.: 09/013,094

[22] Filed: Jan. 26, 1998

[51] Int. Cl.$^7$ ........................................ G06F 12/02
[52] U.S. Cl. ...................... 711/117; 711/104; 711/154; 711/169; 711/201; 707/101
[58] Field of Search ................... 711/141, 169, 711/154, 200, 117; 707/101

[56] References Cited

U.S. PATENT DOCUMENTS

| | | | |
|---|---|---|---|
| 4,398,248 | 8/1983 | Hsia et al. | 364/200 |
| 4,520,439 | 5/1985 | Liepa | 364/200 |
| 4,768,148 | 8/1988 | Keeley et al. | 711/141 |
| 5,379,696 | 1/1995 | Song | 348/699 |
| 5,553,263 | 9/1996 | Kalish et al. | 711/127 |
| 5,619,662 | 4/1997 | Steely, Jr. et al. | 712/216 |
| 5,796,976 | 8/1998 | Shah | 711/201 |
| 5,995,167 | 11/1999 | Fukushima et al. | 348/714 |

OTHER PUBLICATIONS

"Pentium Pro Family Developer's Manual: vol. 1: Specifications", Intel Corporation 1996, ISBN 1–55512–259–0.

Primary Examiner—Hiep T. Nguyen
Attorney, Agent, or Firm—Antonelli, Terry, Stout & Kraus, LLP

[57] ABSTRACT

A computer system including a slice-addressable multi-port memory array is disclosed. The slice-addressable multi-port memory array provides a mechanism for efficient data merging in a memory controller in accordance with an associated array of slice-enable bits. Each slice of the memory array is individually designated by a slice-enable bit, and only those slices of a word line enabled for writing that are designated by a slice-enable bit are modified during a write operation. In a subsequent write-merge operation, the slices of the word line enabled for writing that were not designated by slice-enable bits during the write operation are modified, and the slices that were modified during the preceding write operation are unaffected, thereby providing for efficient merger of data from the write operation and data from the write-merge operation in a single word line. Also provided is a method of preserving cache coherency in a computer system when a hit on a modified line in a cache is detected during a memory-write operation. The method includes setting a slice enable bit associated with each slice of the cache line modified by the memory write operation; writing data to slices of a word line associated with the set slice enable bits in the slice-addressable random access memory buffer; and write-merging data from the modified cache line to slices of the word line not associated with the set slice-enable bits in the slice-addressable random access memory buffer.

24 Claims, 3 Drawing Sheets

CONTROLLER THAT SUPPORTS DATA MERGING UTILIZING A SLICE ADDRESSABLE MEMORY ARRAY

FIELD OF THE INVENTION

The present invention is directed to data processing in a computer system. More particularly, the present invention is directed to merging data in a slice-addressable random access memory array.

BACKGROUND OF THE INVENTION

Data merging is a process by which two subsets of a multiple bit data word or data line can be combined to form a new version of the data word or data line that incorporates both subsets. If elements of a data line are separately modified by two different agents, either agent or both agents having a cached version of the data line, then the changes made by both agents can be reconciled by merging the data. For example, in a multiprocessor computer system wherein each processor has a dedicated cache memory and one processor is modifying a cache line previously modified by another processor, cache coherency can be obtained by properly merging the cache line data. Data merging can be performed in the main system memory or, in a computer system including buffering of data being read from and written to memory, in the data buffers.

Cache memory systems are used to compensate for the relatively slow access times of dynamic random access memory ("DRAM") that is used for main system memory in many computer systems. Cache memory is typically constructed of high speed static random access memory ("SRAM") which provides random access capabilities at a much higher speed than DRAM. SRAM is typically not used for main system memory because it is considered prohibitively expensive and hence impracticable for use in the quantities required for primary system memory, typically several megabytes in contemporary computer systems. A cache memory system speeds memory access by maintaining copies of frequently accessed data read from the main system memory in a cache. When a processor or other agent requests data stored in the system memory, the cache memory is first checked to determine if the data is stored in the cache. If the requested data is stored in the cache, then the data is read from the high speed cache memory without incurring the delays inherent in accessing main system memory. If the requested data is not in cache memory, then the data is read from the main system memory and copied into the cache as well. A cache controller then updates a directory which is part of the cache memory system. This directory cross references the cache memory with the address of the corresponding data in the main system memory.

In a computer system where the memory may be modified by several agents independently, such as a multiprocessor system or a system with independent input/output and processor buses, cache coherency is a significant problem. Cache coherency refers to the problem of maintaining the same information in both the cache memory and main memory. For example, cache coherency problems frequently arise in multiprocessor systems, where each processor has a dedicated cache. When two processor caches have the same data cached (i.e., both processors requested data from the same address in memory), one or both processors may independently alter the cached data. When that occurs, cache coherency has been lost and coherency between the caches must be restored. Cache coherency is restored by rewriting the cached data to main memory, including all of the modifications made to the data in the cached memory.

Cache coherency problems also arise in computer systems where main memory can be modified by multiple independent subsystems such as input/output subsystems and/or graphics subsystems without any direct processor interaction. In order to ensure cache coherency, a mechanism is required by which processors and other agents on a processor or host bus are notified of memory modifications made by the independent subsystems so the system can respond to a loss of cache coherency.

In a computer system with a memory controller including data buffering, cache coherency can be restored by merging data from two sources in or into the memory controller data buffers. The data buffer memory in the memory controller then contains the updated data, including any changes made by either or both sources, and when the buffered data is subsequently rewritten to the main memory, the data in main memory is the same as the corresponding cached data without requiring two separate writes to main memory.

In a cached memory system that includes processors and other agents with caches, memory transactions are typically performed in units of cache lines. Although the main system memory is typically organized in discrete bytes or words, cache memory is organized in cache lines, primarily to accelerate the process of determining whether requested data is in cache memory or not. Each cache line typically includes several bytes or data words and a single cache line corresponds to several sequential locations in the main system memory. A cache line is the smallest unit of information that can be mapped by a cache and whenever a cache miss occurs (i.e., the requested data is not in the cache), an entire cache line of data must be read from the main system memory. Thus, even though agent transactions and/or input/output transactions may only involve a single byte or data word, an entire cache line is transferred to and from memory when data is modified, and it is within a cache line that data merging occurs.

Prior art methods of data merging in a memory controller data buffer have required complex circuitry and undesirably lengthy operations to accomplish data merging. For example, in one prior art system, the cache line data was first extracted from the cache memory and placed in a plurality of holding registers, the number of holding registers corresponding to the number of distinct words or minimum addressable units in the cache line. Thus, for example, a cache line of one quad word would require four separate holding registers. In addition, a fifth holding register is required for a word being merged with the cache line.

The holding register for the word being merged into the cache line was loaded through a 3:1 multiplexer circuit with inputs from the input/output subsystem, the memory subsystem, and the processor bus. All of the holding registers were then coupled to a 5:1 multiplexer. The inputs corresponding to the four holding registers (including the holding register containing the word being merged) containing coherent data were serially selected and coupled through the multiplexer to a data buffer constructed as a first in first out ("FIFO") queue and the data in the register corresponding to the modified word was ignored. Cache coherency was then obtained by transferring the buffered data stored in the FIFO queue to the main system memory which would no longer be stale when the buffered data was rewritten.

Although this prior art system provided a mechanism for data merging, it occupied a significant amount of space for the multiplexers and FIFO queues, particularly in view of the fact that FIFO queues are typically implemented with flip flops and multiple queues were required, one for memory read operations and one for memory write operations for each input/output port of the memory controller. Thus, for example, a computer system with independent processor, graphics and input/output buses would require a minimum of six FIFO buffer queues, each of which would require its own set of dedicated holding registers and multiplexer switching circuits. Moreover, the prior art system took an undesirably long time to accomplish data merging since the data has to be moved into holding registers and then sequentially loaded into the FIFO queue, a process which can only occur one word at a time. The inherent limitations of the prior art data buffering limit the number of input/output ports that can be effectively coupled to a memory controller because of the non-scalable structure of the prior art.

Accordingly, there is a need for an efficient mechanism for data merging in a memory controller that does not require extensive multiplexer circuitry, a multiplicity of holding registers, and flip-flop based FIFO queues and can scalably merge data quickly and efficiently.

SUMMARY OF THE INVENTION

According to an embodiment of the present invention, a scalable mechanism is provided for data merging in a slice addressable random access memory array. Each slice of the memory array is individually designated by a slice enable bit, and only those slices designated by a slice enable bit are modified during a write operation. In a subsequent write merge operation, only the slices that were not designated by slice enable bits during the write operation are modified, and the slices that were modified during the preceding write operation are unaffected. Accordingly, the data is merged efficiently.

DETAILED DESCRIPTION

Figure 1:
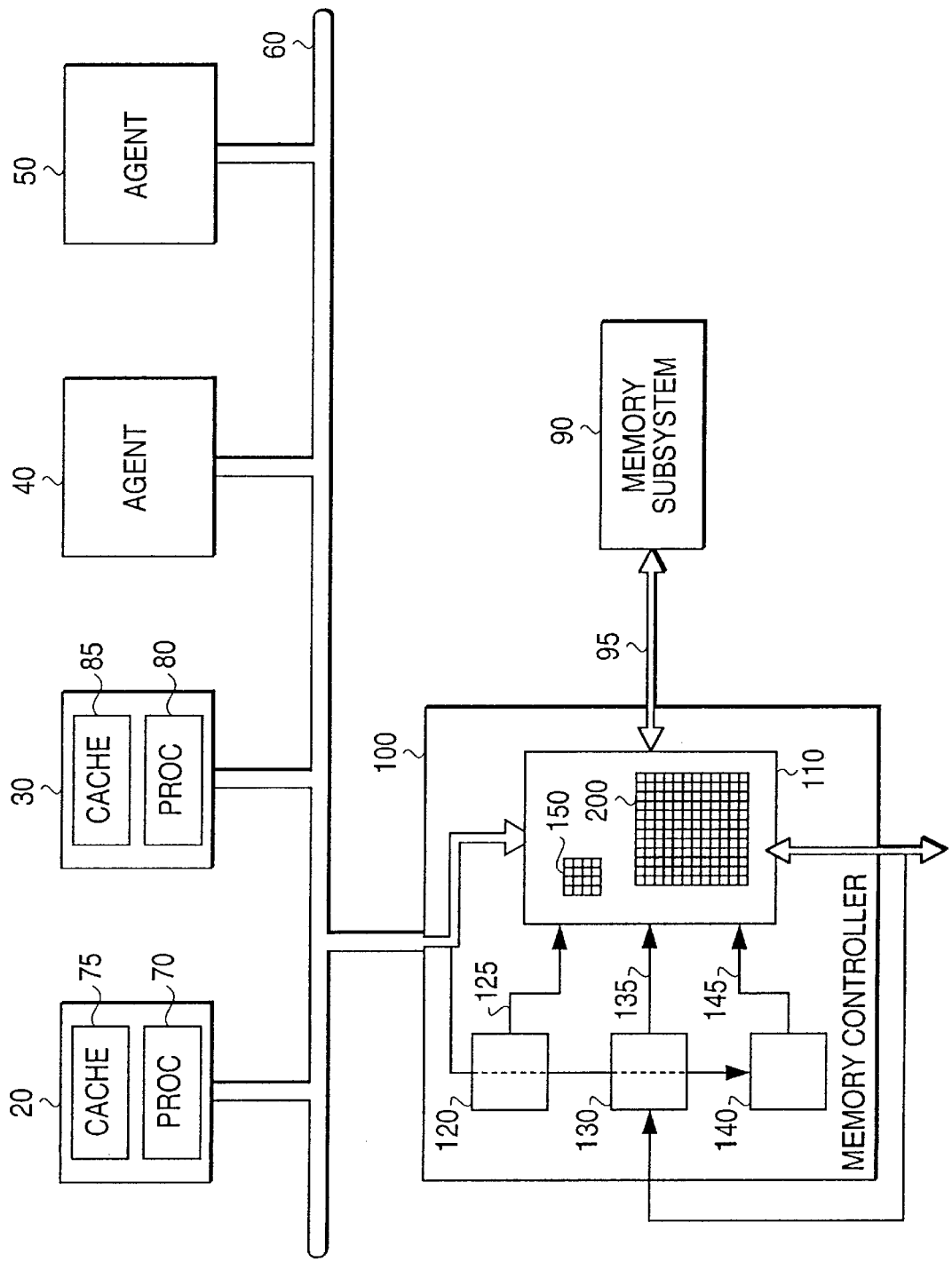
FIG. 1 is a block diagram of a memory controller in a multiprocessor system in accordance with an embodiment of the present invention.

An exemplary computer system incorporating the teachings of the present invention is shown in FIG. 1. Although the exemplary computer system of FIG. 1 is a multiprocessor computer system, the present invention is not limited to multiprocessor systems, and is equally applicable to any single processor system in which data merging may be desirable such as, for examples, a graphics processing system or in which cache coherency problems may arise. Referring to FIG. 1, a plurality of agents 20–50 are coupled to a processor/host bus 60. These agents may be, but are not limited to, microprocessors. In the illustrated embodiment, agent 20 is a microprocessor 70 with an associated cache 75. Similarly, agent 30 is a microprocessor 80 with an associated cache 85.

The processor/host bus 60 interfaces with a dynamic random access memory subsystem 90 through memory input/output bridge controller 100. In the illustrated embodiment, memory subsystem 90 represents the main system memory. Although the illustrated embodiment shows an integrated controller, the present invention is applicable to any computer system with data buffers such as, for example, in a dedicated memory controller.

Referring to FIG. 1, controller 100 includes three control subsystems and one data buffer subsystem, the three subsystems corresponding to the processor/host bus, the input/output bus, and the memory bus. Processor/host bus subsystem 120 processes transactions from agents on processor/host bus 60. Input/output subsystem 130 processes transactions from the input/output devices on input/output bus 65, and RO memory subsystem 140 processes transactions from the main memory subsystem 90 on memory bus 95.

Each of the aforementioned subsystems in controller 100 is coupled to data buffering subsystem 110 as indicated by signal buses 125, 135 and 145. Data subsystem 110 includes a random access memory data buffer 200, an address decoder, and an M×N array of slice enables 150, where M is the number of data lines buffered by the random access memory data buffer 200 and N is the number of uniquely addressable slices in a data line. Although the illustrated embodiment shows a data line which is equivalent to a cache line in the disclosed system and is segmented into bytes, the present invention is not so limited, and encompasses data lines that may or may not be equivalent to a cache line and slices which can vary in size from a single bit to an entire data line. Moreover, although an exemplary embodiment of the present invention is described with reference to a system including memory caching, the present invention is equally applicable to computer systems without caching.

In the illustrated embodiment, all memory transactions are directed through data subsystem 110. Accordingly, the random access memory data buffer in data subsystem 110 provides a slice addressable data buffer 200 wherein data coherency can be maintained with respect to input/output transactions, bus transactions, and memory transactions. In a preferred embodiment of the present invention, data buffer 200 is constructed of high-speed multi-ported static random access memory ("SRAM"). A data buffer constructed of multi-ported static random access memory advantageously eliminates the need for space-consuming flip-flop FIFO queues for data buffering, providing bidirectional buffering capability with memory devices that are faster and require less space than the prior art flip-flop based queues. Moreover, multi-ported random access memory is advantageously scalable for multiple independent input/output ports on the memory controller, simply requiring an equivalent number of ports in the multi-ported random access memory without replication of holding registers and multiplexer circuits as in the prior art.

Data coherency is readily achieved in the present invention by efficient data merging in the slice addressable random access memory data buffers 200 of the present invention whenever a cache line with stale data is being written to memory subsystem 90. In an embodiment of the present invention, agents on processor/host bus 60 with caches can snoop transactions that are not processed on processor/host bus 60, such as, for example, an input/output bus 65 transaction that results in data in the main system memory being modified. As described below, a hit on a modified line is pulled when an agent on processor/host bus 60 has modified data on the same cache line and a write merge operation merges the data from input/output bus 65 transaction and the processor/host bus 60 in the data subsystem 110 before it is written to memory subsystem 90.

Figure 2:
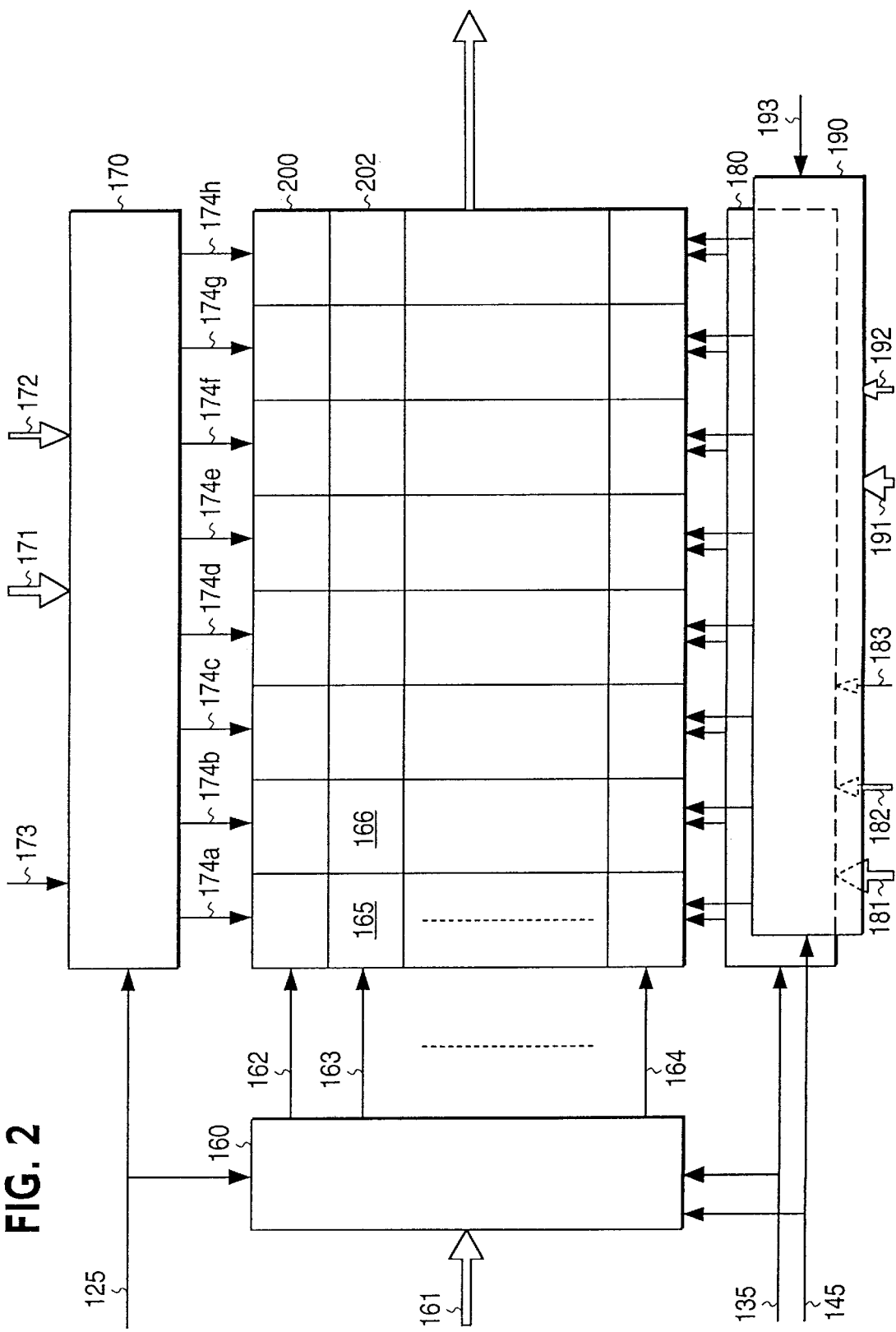
FIG. 2 is a block diagram of a slice addressable multi-port buffer memory in accordance with an embodiment of the present invention.

FIG. 2 shows a more detailed representation of part of the data subsystem 110 of controller 100, particularly the buffer memory 200 and the circuits associated with data merging. The illustrated embodiment of data subsystem 110 includes three command buses and three command control interfaces corresponding to the processor/host bus, input/output bus and memory subsystems. However, the present invention is highly scalable and may be used with any number of input/output ports in the memory controller. In an embodiment of the present invention, the multi-ported random access memory comprising data buffers 200 has the same number of ports as the memory controller 100 has input/output ports, ensuring that data from multiple input/output ports can be advantageously merged in data buffers 200 without requiring multiplexer circuits and holding registers.

System command bus 125 provides a communication path for encoded write and write merge commands, control signals, and address information from bus subsystem 120 to address decoder 160 and RAM command control interface 170. Similarly, input/output command bus 135 provides a communication path for encoded commands, control signals and address information from input/output subsystem 130 to address decoder 160 and RAM command control interface 180. Data subsystem 110 includes a third command bus, memory command bus 145, which provides a communication path between the memory subsystem 140 and address decoder 160 and RAM command control interface 190.

The random access memory array forming data buffers 200 is preferentially comprised of high speed static random access memory, as noted above, but any kind of slice addressable random access memory may be used for the data buffers of the present invention. Data buffers 200 are comprised of an array of data lines where the number of bits in each data line and the number of data lines in the data buffers memory vary with the specific implementation. In a preferred embodiment, each data line corresponds to a cache line and the size of a cache line is an implementation decision that may vary, for example, with the size of the cache lines used by agents in a particular system.

In the illustrated embodiment of FIG. 2, the data lines are arrayed horizontally (corresponding to word lines in a typical memory subsystem), and the slices are arrayed vertically (corresponding to the columns or bits in a typical memory subsystem). A location in the random access memory array is accessible when both the world line associated with the location's data line and the slice enable line(s) associated with the location's position in the data line are enabled for access. Memory locations without both word lines and slice enable line(s) enabled for access are not affected by operations on other memory locations. In the illustrated embodiment, address decoder 160 enables writing on the appropriate cache line in response to a buffer ID 161 received from decode logic in bus subsystem 120. The address decoder 160 selects a word line and, when an enable signal is asserted on a command bus (125, 135 or 145), the address decoder drives one of the word lines (162, 163 or 164) which enables one of the rows or data lines of random access memory data buffers 200 for access, subject to assertion of at least one of the slice enable signals.

The data to be written into the data line and the slice enable signals indicating which portions of the data line are to be written to may be communicated to data subsystem 110 from processor/host bus 60 as shown in FIG. 1. If the data being written into the data line originates from the input/output bus, then the data and the slice enable signals designating the portions of the data line being modified are communicated to data subsystem 110 on an input/output bus 65. In an embodiment of the present invention with additional input/output ports in memory controller 100, data and slice enable signals for transactions relating to one of these additional input/output ports would be similarly communicated on a bus associated with the additional input/output port.

In an embodiment of the present invention, the slice enable signals are temporarily stored in a slice enable array 150 which provides support for a pipelined. system wherein the data is not necessarily available when a write command is asserted, although a determination of which slice (or slices) of the data line are being modified can be made without the actual data. However, the actual data being written to or read from memory is not needed to identify the data line affected by a transaction, the bits within the data line being modified by the transaction, or whether data merging is needed for cache coherency. Accordingly, the slice enable signals are advantageously stored temporarily as soon as they are available. In an embodiment of the present invention, slice enable signals are bits within a bit field, each bit corresponding to a slice and the total bit field length corresponding to the number of slices in a data line. Thus, for example, in an embodiment of the present invention wherein a slice is a byte and a data line is sixteen bytes long, there would be sixteen slice enable bits (two bytes) corresponding to a data line temporarily stored. In such an embodiment, slice enable array 150 would be a sixteen column array. The number of rows in slice enable array 150 is equal to the number of cache lines in random access memory array 200 in an embodiment of the present invention, advantageously providing directly corresponding slice enable signals for each data line for efficient pipelining and implementation, although other size arrays may be used.

By designating slices with a bit field, the same bit field can be advantageously used to designate slices during a subsequent write merge command by simply inverting the bits or interpreting a set bit as an enabled slice during a write operation and as a disabled slice during a write merge operation. However, any encoded representation by which enabled slices within a buffered data line can be identified may be used.

Referring again to FIG. 2, command control logic 170 receives data 171 from processor/host bus 60, slice enable signals 172 from slice enable array 150 and a data ready (DRDY#) signal 173 when valid data for the write command is on the bus. Data 181 from the input/output bus 65 is similarly provided to command control interface 180, as are slice enable signals 182. Input/output bus 65 also provides a data write (Data Wr) signal 183 when valid data is available on input/output bus 65. Data 191 from the memory bus and slice enables 192 and a valid data signal 193 are similarly applied to command control interface 190 for memory bus transactions.

When the data is ready, those data bytes which are enabled, as indicated by the slice enables, are written into slice addressable random access memory array 200. Thus, for example, when data is being driven from the processor/host bus 60, the data bytes will be driven to slice addressable random access memory array 200 in response to the appropriate signal on system command bus 125. If, for example, the first and second bytes 165 and 166 of the second data line 202 were to be modified, then word line 163 would be asserted by address decoder 160 and data would be driven on buses 174a and 174b to the first byte 165 and second byte 166 of data line 202. The remaining bytes of data line 202 would not be modified. If a subsequent write merge command were needed because, for example, of a hit on modified line indication pulled on the first write transaction (command) to the data line, the subsequent write merge operation would be accomplished using the same procedures, although the inverse of the slice enable signals would be used to determine which slices of the data line were written to by the write merge command. Thus, data would be driven on buses 174c, 174d, 174e, 174f, 174g and 174h during the subsequent write merge command, efficiently merging the data and ensuring cache coherency for data line 202. The merged data could then be written to memory subsystem 90. Advantageously, the merged data could also be transferred to processor/host bus 60 and/or input/output bus 65 as the data buffers of the present invention may be implemented using multi-ported random access memory allowing flexible data transfers, unlike the FIFO queue structure of prior art data buffering.

The efficient data merging of the present invention allows cache coherency to be maintained with relatively little difficulty. For example, in a computer system as shown in FIG. 1, processor 70 and processor 80 may have independently cached the same cache line during separate operations. If processor 70 later writes to the cache line and processor 80 has a modified version of the cache line in its cache 85, then a hit on modified line (Hitm#) will be pulled from processor 80, indicating that the cache line is stale. Accordingly, the data written by processor 70 needs to be merged with the modified data in the cache line of cache 85 to restore data coherency.

Figure 3:
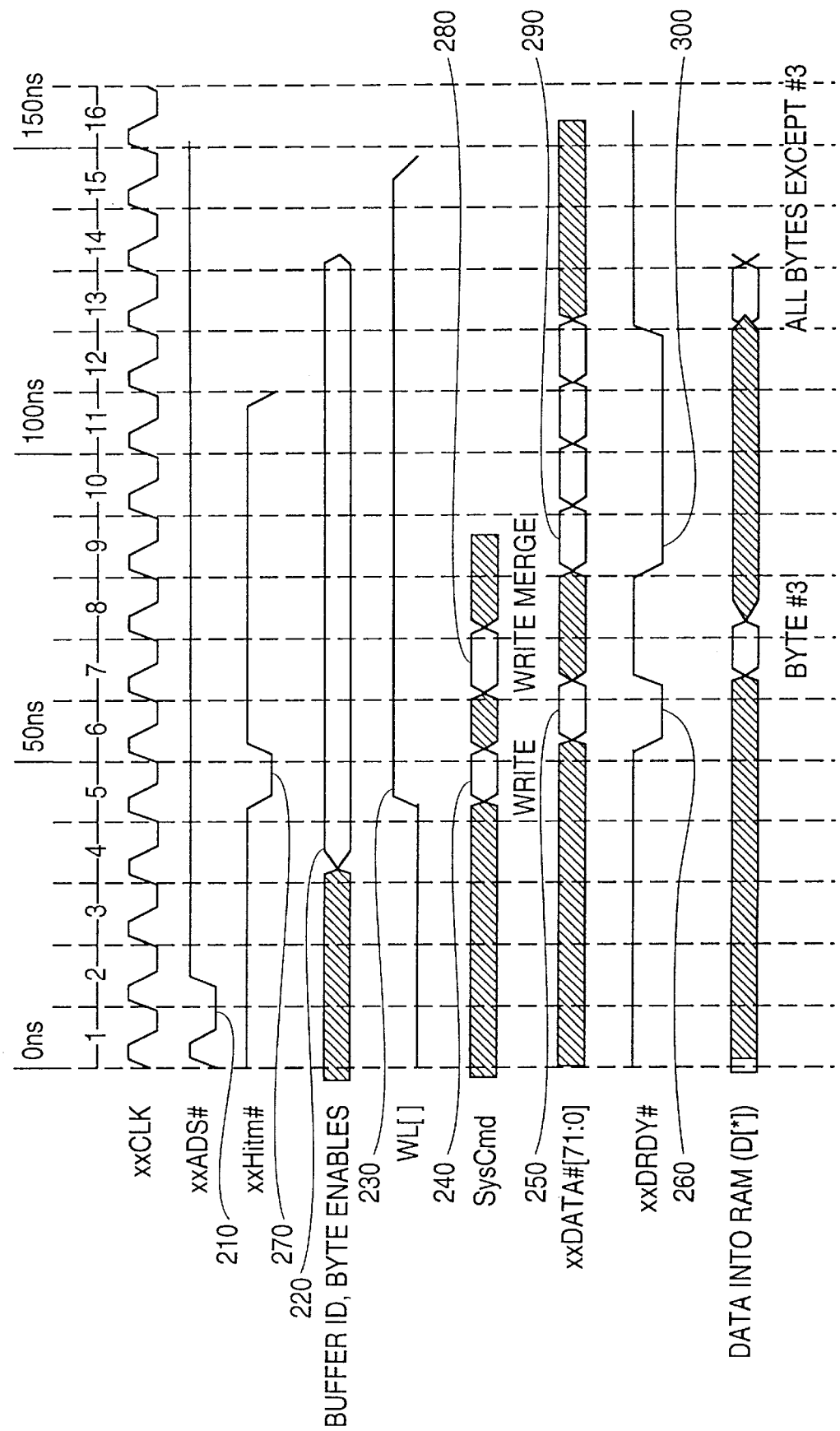
FIG. 3 is a timing diagram illustrating data merging in accordance with an embodiment of the present invention.

Referring to FIG. 3, the process by which this occurs in accordance with an embodiment of the present invention using byte sized slices and data lines equivalent to cache lines is illustrated. Processor 70 issues a write command writing byte number 3 of a data line to the memory, as shown by assertion of the address strobe signal 210. In this example, processor 70 is operating in write-through mode (i.e., all write operations are passed directly to the memory subsystem without modifying the processor cache 75) and the write operation is passed directly to the memory controller where it is buffered in data buffers 200 before being written to memory subsystem 90. In a pipeline bus system, valid data is placed on the bus after the write operation request is made. Nonetheless, the slice enable signals and the appropriate word line address may be determined from the write command without the data. The present invention is advantageously flexible in that slice enable signals may be coupled with the data and the present invention is equally applicable to non-pipelined systems. In the exemplary embodiment shown in FIG. 3, the buffer ID is the address 161 provided to address decoder 160 from which a word line is selected.

The buffer ID and slice enable signals (i.e., byte enables) are driven to the random access memory array 200 at 220. In the illustrated example, processor 70 is writing to byte number 3 of the cache line, thus the only byte enable set is for byte number 3. The address decoder 160 generates the appropriate word line enable signal at 230 and a write command is coupled from processor/host bus 60 to command bus 125 at 240. In the timing diagram of FIG. 3, SysCmd corresponds to system command bus 125 in FIG. 2. The data to be written to byte number 3 of the data line is driven onto the processor/host bus by processor 70 at 250, and byte number 3 is written into the data line in data buffers 200 when the data ready signal 173 is asserted at 260.

Because processor 80 has a modified version of the data line in its cache 85, a hit on a modified line (Hitm) is asserted at 270, notifying the memory controller logic that data merging is required for cache coherency. Accordingly, an implicit write back occurs and a write merge command is asserted on the command bus at 280. Processor 80 drives its modified cache line onto bus 60 at 290 and a data ready signal 173 is asserted at 300. The write merge command uses the same byte enable signals as the proceeding write command but, as noted above, a set bit corresponds to a byte which is not written to during the write merge operation and a cleared bit corresponds to a byte which is written to during the write merge operation. Accordingly, the write merge command does not overwrite the bytes written by the write command and every byte in the data line except the byte number 3 is written by the write merge command.

Data merging using the memory port and/or the input/output port is accomplished in essentially the same way as data merging using only processor/host bus 60. The memory controller 100 puts a snoop transaction on the processor/host bus 60 which, like a write command from another agent on bus 60, will pull a hit on a modified line whenever a processor on bus 60 has a modified version of the data line in its cache. The processor will, in an implicit write back phase invoked by the pulled hit on a modified line, write its cache line to bus 60, allowing the processor modified cache line data to be merged in the memory controller random access memory array 200 before the input/output port initiated transaction, either read or write, is completed. Advantageously, the input/output port transaction is not delayed and cache coherency is maintained in the system.

The novel slice addressable random access memory array data buffer of the present invention provides an efficient and readily expandable mechanism for data merging in a computer system. The use of slice addressable memory allows for efficient data merging without requiring extensive dedicated switching circuitry and space consuming holding registers, thereby making it possible to obtain cache coherency with minimal interference in memory transactions. The use of multi-port random access memory for data buffers advantageously eliminates the need for multiple queues and provides a scalable data buffer that can be readily adapted for any number of input/output ports without an exponential increase in circuitry.

Several embodiments of the present invention are specifically illustrated and/or described herein. However, it will be appreciated that modifications and variations of the present invention are covered by the above teachings and within the purview of the appended claims without departing from the spirit and intended scope of the invention.

For example, the present invention may be used in any system where data merging is desirable and is not limited to data buffering in a system including cached memory. For example, the present invention may be used in a graphics processing system where data from multiple sources requires merging.

What is claimed is:

1. A method of merging first and second data sets from different sources in a slice addressable random-access memory array including an associated array of slice enable bits, said method comprising the steps of:

enabling a row of the slice addressable random access memory array for writing;

designating a slice of said row of the slice-addressable random access memory array enabled for writing by setting an associated bit in the associated array of slice enable bits;

writing the first data set to the designated slice of said row of the slice addressable random access memory enabled for writing; and writing the second data set to previously undesignated slices of said row of the slice addressable random access memory enabled for writing.

2. The method of claim 1, wherein said slices are bytes.

3. The method of claim 1, wherein said slice addressable memory array is a data buffer of a memory controller.

4. The method of claim 1, wherein said associated array of slice enable bits is a vector.

5. The method of claim 1, wherein said associated array of slice enable bits has the same number of rows as said slice addressable random access memory array.

6. The method of claim 1, wherein said associated array of slice enable bits has the same number of columns as said slice addressable random access memory array has slices.

7. The method of claim 1, wherein said associated array of slice enable bits has the same number of rows as said slice addressable memory array and the same number of columns as said slice addressable memory array has slices.

8. A method of preserving cache coherency in a computer system when a hit on a modified line in a cache is detected during a memory write operation, said computer system including a slice addressable random access memory buffer comprised of at least one word line corresponding to a cache line, and an array of slice enable bits associated with slices of the word line of the slice addressable random access memory buffer, said method comprising the steps of:

setting a slice enable bit associated with each slice of the cache line modified by the memory write operation;

writing data to the slices of said word line associated with said set slice enable bits in said slice addressable random access memory buffer; and write merging data from the modified cache line to the slices of said word line not associated with said set slice enable bits in said slice addressable random access memory buffer.

9. A data buffer in a memory controller of a computer system including a processor, a processor bus, and a memory subsystem, said data buffer comprising:

a slice addressable random access memory array having a plurality of word lines comprised of slices;

a memory bus configured for communication between said slice addressable random access memory array and said memory subsystem;

a first interface coupled between said slice addressable random access memory array and said processor bus, said first interface including a plurality of individually enabled-data paths configured for data communication with said slices of said slice addressable random access memory array and a second interface coupled between said slice addressable random access memory array and an input/output bus said second interface including a plurality of individually enabled data paths configured for data communication with said slices of said slice addressable random access memory array.

10. The data buffer of claim 9, wherein said slice addressable random access memory is multi-ported.

11. The data buffer of claim 10, further comprising:

a third interface coupled between said slice addressable random access memory array and another input/output bus, said third interface including a plurality of individually enabled data paths configured for data communication with said slices of said slice addressable random access memory array.

12. The data buffer of claim 9, wherein said slice addressable random access memory array is comprised of static random access memory.

13. The data buffer of claim 10, further comprising an address decoder operably coupled to said slice addressable random access memory array, said processor bus, and said input/output bus for coupling a word line enable to said slice addressable random access memory array responsive to said processor bus and said input/output bus.

14. The data buffer of claim 9, wherein said memory controller further comprises an array of slice enables operably coupled to said first interface such that said first interface individually enables a data path configured for data communication with a slice of said slice addressable random access memory array responsive to said slice enables.

15. The data buffer of claim 14, wherein said slice enables are bits and said first interface individually enables a data path configured for data communication with a slice of said slice addressable random access memory array responsive to said slice enable bit being set.

16. The data buffer of claim 14, wherein said slice enables are bits and said first interface individually enables a data path configured for data communication with a slice of said slice addressable random access memory array responsive to said slice enable bit being reset.

17. The data buffer of claim 10, wherein said memory controller further comprises an array of slice enables operably coupled to said second interface such that said second interface individually enables a data path configured for data communication with a slice of said slice addressable random access memory array responsive to said slice enables.

18. A computer system, comprising:

a host memory;

a plurality of agents;

a memory controller operatively connected to said plurality of agents, via a system bus and/or an input/output bus, operatively connected to said host memory, via a memory bus, and configured to perform data merging to preserve cache coherency, said memory controller comprising:

a slice addressable random access memory array having multiple input/output ports and a plurality of word lines comprised of slices;

a first interface provided to interface said slice addressable random access memory array with said system bus for data communication with said slices of said slice addressable random access memory array; and a second interface provided to interface said slice addressable random access memory array with said input/output bus for data communication with said slices of said slice addressable random access memory array.

19. The computer system of claim 18, wherein said memory controller further comprises a third interface provided to interface said slice addressable random access memory array with another input/output bus for data communication with said slices of said slice addressable random access memory array.

20. The computer system of claim 19, wherein said slice addressable random access memory array is comprised of static random access memory.

21. The computer system of claim 19, wherein said memory controller further comprises an address decoder operably coupled to said slice addressable random access memory array, said system bus and said input/output bus, for coupling a word line enable to said slice addressable random access memory array responsive to said system bus and said input/output bus.

22. The computer system of claim 19, wherein said memory controller further comprises an array of slice enables operably coupled to said first interface such that said first interface individually enables a data path configured for data communication with a slice of said slice addressable random access memory array responsive to said slice enables.

23. The computer system of claim 22, wherein said slice enables are bits and said first interface individually enables a data path configured for data communication with a slice of said slice addressable random access memory array responsive to said slice enable bit being set.

24. The computer system of claim 19, wherein said memory controller further comprises an array of slice enables operably coupled to said second interface such that said second interface individually enables a data path configured for data communication with a slice of said slice addressable random access memory array responsive to said slice enables.

* * * * *